United States Patent Office 3,235,596
Patented Feb. 15, 1966

3,235,596
QUATERNARY AMMONIUM COMPOUNDS
Robert Nordgren, Leonard R. Vertnik, and Harold Wittcoff, Minneapolis, Minn., assignors to General Mills, Inc., a corporation of Delaware
No Drawing. Filed Mar. 8, 1963, Ser. No. 263,723
8 Claims. (Cl. 260—567.6)

This invention relates to novel polymers and more particularly to novel quaternary ammonium polymers.

The polymers of the present invention are characterized by the recurring structural unit:

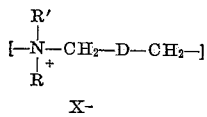

wherein D is a dimeric fat radical, R and R' are selected from the group consisting of aliphatic and aryl radicals having 1 to 20 carbon atoms, and X is a quaternary ammonium anion. These polymers are prepared by the quaternization of a polysecondary amine as illustrated by the equation:

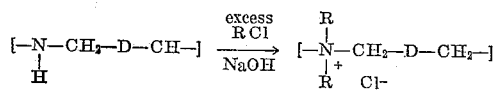

wherein D and R are as defined above. The polymeric secondary amines are characterized by the recurring structural unit:

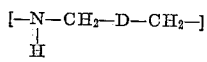

The polysecondary amines are conveniently prepared by the condensation polymerization of a fatty dinitrile derived from a dimerized fat acid. In addition to the homopolymer products prepared by the homo-condensation of a fatty dinitrile, copolymer polysecondary amine products can be prepared by the condensation copolymerization of a fatty dinitrile and a dinitrile copolymerizable therewith.

The condensation polymerization of the fatty dinitriles is accomplished by hydrogenating a fatty dinitrile under secondary-amine-forming conditions. By "secondary-amine-forming conditions" is meant that set of hydrogenation conditions under which a fatty nitrile preferentially forms a secondary amine rather than a primary amine. Secondary fatty amines are commercially available products and the conditions necessary to produce them are well understood in the art. Typical reaction conditions utilize hydrogen pressures in the range of 25 to 1000 p.s.i.g. at temperatures in the range of 200 to 290° C.

The preparative reaction is illustrated by the following equation:

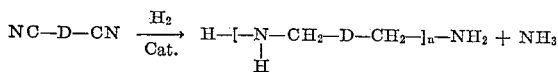

where D is a dimeric fat radical and $n$ is the number of recurring units in the polymer chain. As illustrated in the equation, an ammonia by-product is formed. In order to obtain optimum yields of the desired polymer product, the ammonia by-product should be removed. Generally this is done by "sweeping" the reaction mixture with hydrogen gas.

Depending on the reaction conditions employed, the polymer products will vary in molecular weight from dimers in which $n$ in the foregoing equation is 2, to high molecular weight products in which $n$ is 40 or greater. The molecular weight of the polymer product can be varied by selection of the reaction conditions. Mild reaction conditions tend to produce lower molecular weight polysecondary amines while extremely severe reaction conditions produce insoluble cross-linked polymers. The lower molecular weight polysecondary amines are readily pourable, viscous liquids which resemble a heavy sirup. They are generally pale amber in color and are readily soluble in most common organic solvents. As the molecular weight increases, the products are generally more viscous, less soluble and darker in color. Products in which $n$ is about 20 are extremely viscous and are difficult to pour even when heated.

A hydrogenation catalyst is employed to prepare the polysecondary amines. Generally, any nitrile hydrogenation catalyst can be employed. The preferred catalysts are Raney nickel and copper-chromite catalysts. Other suitable catalysts include Raney cobalt, platinum, palladium, palladium on charcoal, platinum on charcoal, nickel on kieselguhr, copper-nickel carbonate, cadmium-copper-zinc chromite, copper-nickel oxide, and the like.

The "copper-chromite catalyst" referred to above is often referred to as "copper-chromium oxide catalyst." Preparation of copper-chromite catalysts is discussed in an article by Connor, Folkers, and Adkins, in the Journal of the American Chemical Society, vol. 54, page 138–45 (1932); and in "Reactions of Hydrogen with Organic Compounds Over Copper-Chromium Oxide and Nickel Catalysts," by Homer Adkins, University of Wisconsin Press, Madison, Wisconsin, (1937). The nature of this catalyst is further discussed in an article by Adkins, Burgoyne, and Schneider in the Journal of the American Chemical Society, vol. 72, page 226–29 (1950). Commercially available copper-chromite catalysts often contain amounts of catalyst stabilizers, e.g., barium oxide, calcium oxide, and magnesium oxide. Catalysts containing such stabilizers can be employed, if desired. While many types of copper-chromite catalysts are commercially available and are generally useful in preparing polysecondary amines, it is preferred to employ a catalyst containing 40 to 65% CuO (assuming all copper is present as CuO) and 35 to 60% $Cr_2O_3$ (assuming all chromium to be present as $Cr_2O_3$).

The amount of catalyst employed is not critical. However, the molecular weight and other properties of the polymer product will vary depending on the amount and type of catalyst used. Generally, catalyst in the amount of 1 to 10% by weight, based on the weight of the nitrile charge, is sufficient for most purposes. Larger and smaller amounts of catalyst can be employed if desired.

The dinitrile starting materials for preparing the polysecondary amines are the dinitriles prepared from dimerized fat acids. Relatively pure dimerized fat acids can be distilled from commercially available polymer fat acids mixtures. The term "polymeric fat radical" as used herein refers to the hydrocarbon radical of a polymeric fat acid. The term "polymeric fat acid" refers to a polymerized fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the low yields of polymeric products, these materials are not commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched and straight chain, poly- and mono-ethylenically unsaturated acids such as 3-octenoic acid, 11-dodecanoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nevronic acid, linoleic acid, linolenic acid, eleostearic acid, hiragonic acid, moroctic acid, timnodonic acid, eicosatetraenoic acid, nisinic acid, scoloiodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and polyunsaturated, are useful monomers for the preparation of the polymeric fat acids. Suitable examples of such materials include 10-undecynoic acid, tariric acid, stearolic acid, behenolic acid, and isamic acid.

Because of their ready availability and relative ease of polymerization, oleic and linoleic acid and mixtures thereof are the preferred starting materials for the preparation of the polymeric fat acids.

The dimerized fat acid is then converted to the corresponding dinitriles by reacting the dimerized fat acid with ammonia under nitrile forming conditions. The details of this reaction are set forth in chapter 2 of "Fatty Acids and Their Derivatives," by A. W. Ralston, John Wiley & Sons, Inc., Now York (1948). If desired, the dinitrile may then be purified to the desired degree by vacuum distillation or other suitable means. Generally, the high purity dinitrile tends to produce linear polysecondary amines of high molecular weight. If appreciable amounts of mononitrile are present, the polymer will be of low molecular weight, since these materials act as chain stoppers. The presence of trinitriles and other higher polyfunctional nitriles tends to produce a cross-linked polymer. A sufficient amount of trinitriles will provide a gelled product.

Copolymeric polysecondary amines can be prepared by copolymerizing mixtures of dinitriles. The desired dinitrile comonomer is added to the reaction mixture along with the fatty dinitrile. After subjecting the mixture to polymerization conditions, there is obtained a copolymer having randomly distributed recurring units:

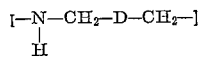

and

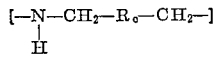

where D is a dimeric fat radical and $R_c$ is a divalent radical derived from the comonomer dinitrile. Generally, any copolymerizable dinitrile can be employed. Specific examples of simple nitriles which can be employed as comonomers include the dinitriles derived from such acids as adipic acid, pimelic acid, suberic acid, azelaic acid, and sebacic acid. Mixtures of two or more fatty dinitriles can also be copolymerized. A large variety of other dinitriles are likewise useful.

In theory, the formation of the polymeric secondary amine proceeds through the preliminary reduction of the nitrile to the primary amine followed by conversion of the primary amine to the polymeric secondary amine. Accordingly, this provides an alternate route for the preparation of the polymers. In the alternate route, the polyamines are formed separately and then converted to the polymeric amines under the conditions previously described, although it is possible to use somewhat milder conditions. In this instance, it is possible to use a variety of other polyamines as comonomers including some comonomers such as metaxylylene diamines which may not be readily employed in the form of nitriles.

From a practical standpoint, there may be certain advantages in thus carrying out the preparation of the polymeric secondary amines in two steps since it makes possible the removal of any by-products formed in the first step, i.e., the formation of the primary amine, and thus enhances the purity of the final product. In addition, the milder conditions used to form the polymeric secondary amine from the di-primary amine results in less degradation and thus further enhances the purity of the product.

Generally, the end groups of the polymers of the polysecondary amines will be either amine groups or nitrile groups. Where the polymers are prepared by condensing amines, all the end groups will be primary amines:

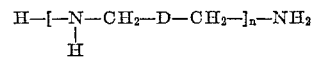

where D and $n$ are as previously defined. Where a dinitrile is used as the starting material and the reaction conditions are mild and the reaction time is short, the end groups will be mainly nitrile groups:

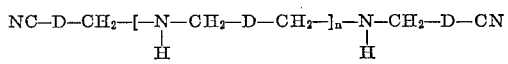

wherein D and $n$ are as previously defined. When dinitriles are used as the starting material, under many reaction conditions a mixture of polymers will be obtained, some chains terminating in nitrile groups and other chains terminating in amine groups. Where severe reaction conditions are utilized, the degradation of functional groups may cause some chains to terminate in hydrocarbon groups.

The preparation of the polysecondary amines will be better understood with respect to the following examples. Unless otherwise specified, all parts and percentages used herein are by weight.

*Example A*

Into a 1 liter stirred autoclave were charged 417 grams of distilled dimer nitrile prepared from dimerized linoleic acid and 10 grams of water-wet Raney nickel catalyst. The autoclave was flushed with hydrogen, sealed under 150 p.s.i.g. hydrogen and rapidly heated to 200° C., at which time a continuous venting of hydrogen was begun such that the hydrogen coming into the autoclave was at 240 p.s.i. and the actual pressure in the autoclave was approximately 230 p.s.i. Heating was continued until the desired reaction temperature of 270° C. was reached. The hydrogenation was continued at this temperature for a period of 1⅓ hours. The reaction mixture was then cooled to below 200° C. and the catalyst was filtered off. There was obtained a product having a Brookfield viscosity of 114 poises at 25° C., a molecular weight of 4600 and an inherent viscosity of 0.165 as measured on a 0.5% solution in meta-cresol. Infrared analysis indicated that no nitrile groups were left in the product. The product contained 12.4% primary amine groups, 72.7% secondary amine groups, and 5.5% tertiary amine groups.

Example B

Example A was repeated except 21 grams of a commercially available copper-chromite catalyst "G–13," was substituted for the Raney nickel catalyst of Example A. There was obtained a product having a Brookfield viscosity of 4220 poises at 25° C., a molecular weight of 10,100 and an inherent viscosity of 0.262 as measured on a 0.5% solution in meta-cresol. The product contained 8.0% primary amine groups, 84.4% secondary amine groups, 5.1% tertiary amine groups and no nitrile groups.

Example C

Example B was repeated except that the reaction was run at 250° C., for a period of 5⅓ hours. There was obtained a product having a Brookfield viscosity of 6200 poises at 25° C., a molecular weight of 11,000, and an inherent viscosity of 0.335 as measured on a 0.5% solution in meta-cresol. The product contained 6.5% primary amine groups, 85.9% secondary amine groups, 5.7% tertiary amine groups, and no nitrile groups.

Example D

Example B was repeated except that the reaction time was increased to 2 hours. There was obtained a product having a Brookfield viscosity of greater than 20,000 poises at 25° C., a Brookfield viscosity of 6400 poises at 60° C., a molecular weight of 9900, and an inherent viscosity of 0.334 as measured on a 0.5% solution in meta-cresol. The product contained 7.0% primary amine groups, 81.4% secondary amine groups, 7.6% tertiary amine groups, and no nitrile groups.

Example E

Into a 1 liter stirred autoclave were charged 400 grams of crude undistilled dimer nitrile prepared from vacuum stripped dimerized linoleic acid, and 100 grams monomer nitrile prepared from the recovered monomeric acid obtained from the polymerization of linoleic acid, and 25 grams of copper-chromite of Example B. After hydrogenation at 280° C. for 1⅓ hours, there was obtained a product having a Brookfield viscosity of 241 poises at 25° C., 6.9% primary amine groups, 81.2% secondary amine groups, 5.6% tertiary amine groups, and 2.8% nitrile groups.

Example F

A crude undistilled dimer nitrile prepared from vacuum stripped dimerized linoleic acid was treated with a mixture of copper-chromite catalyst recovered from the reaction mixture of a previous successful hydrogenation and diatomaceous earth. The level of catalyst used in this pretreatment was about 5% by weight, based on the nitrile. The dimer nitrile was recovered by filtration. Into a 1 liter stirred autoclave were charged 442 grams of the treated dimer nitrile and 21 grams of the copper-chromite catalyst of Example B. After hydrogenation at 280° C. for 1⅓ hours, there was obtained a product having 9.2% primary amine groups, 71.9% secondary amine groups, 5.8% tertiary amine groups, and 5.6% nitrile groups. The product had a Brookfield viscosity of 639 poises at 25° C. and a molecular weight of 4200.

Example G

A crude undistilled dimer nitrile prepared from vacuum stripped dimerized linoleic acid was treated with 1.5 grams of sodium hydroxide dissolved in ethanol. Thereafter, 400 grams of the treated dimer nitrile and 20 grams of the copper-chromite catalyst of Example B were charged into 1 liter autoclave. After hydrogenation at 280° C. for 1½ hours there was obtained a product having a molecular weight of 3000, a Brookfield viscosity at 25° C. of greater than 20,000 poises and a Brookfield viscosity at 60° C. of 1,260 poises. Analysis of the product indicated that it had 15.8% primary amine groups, 60.7% secondary amine groups, 9.4% tertiary amine groups, and no nitrile groups.

Example H

Into a 1 liter stirred autoclave were charged 530 grams of a distilled dimer nitrile having an iodine value of 8.5 prepared from a distilled dimer acid essentially saturated by hydrogenation having an iodine value of 8.4 and 25 grams of the copper-chromite catalyst of Example B. After hydrogenation for 3 hours at 270° C. there was obtained a product having an apparent molecular weight of 5,800, an iodine value of 10.3, a Brookfield viscosity of greater than 20,000 poises at 25° C., and a Brookfield viscosity of 2,240 poises at 60° C. The product contained 9.6% primary amine groups, 76.7% secondary amine groups, 5.4% tertiary amine groups, and no nitrile groups.

Example I

Into a 1 liter stirred autoclave were charged 405 grams of distilled dimer nitrile prepared from dimerized linoleic acid, 81 grams of adiponitrile, and 25 grams of the copper-chromite catalyst of Example B. After hydrogenation at 270° C. for 2 hours, there was obtained a copolymer product having 6.3% primary amine groups, 49.6% secondary amine groups, 18.1% tertiary amine groups, a Brookfield viscosity of 338 poises at 25° C., and a Brookfield viscosity of 60 poises at 60° C.

Example J

Example A was repeated except that the hydrogenation was carried out at a reaction pressure of 90 p.s.i. for 4 hours at 232 to 248° C. using 10 g. of methanol-wet Raney nickel catalyst. There was obtained a product having 1% primary amine groups, 72.3% secondary amine groups, 6.1% tertiary amine groups, 11.8% nitrile groups, an iodine value of 83.4, and a Brookfield viscosity of 660 poises at 25° C.

Example K

Into a 1 liter stirred autoclave was charged 300 grams of a distilled dimer diamine having a total amine number of 205.1 as compared to theoretical value of 204.2 which was prepared by hydrogenating dimer nitrile in the presence of ammonia, and 12 grams of methanol-wet Raney nickel catalyst. After hydrogenating the mixture for 2 hours using the conditions of Example A, there was obtained a polymeric product having 23.3% primary amine groups, 69.5% secondary amine groups, 4.8% tertiary amine groups, and a Brookfield viscosity of 65.2 poises at 25° C.

Example L

Into a 1 liter stirred autoclave was charged 68 grams of meta-xylene diamine, 291 grams of the distilled dimer diamine of Example L, and 10 grams of the copper-chromite catalyst of Example B. After hydrogenating for 1⅔ hours using the reaction conditions of Example A, there was obtained a copolymeric product having an amine number due to secondary amines of 117.8. In comparison, the product of Example L had an amine number due to secondary amines of 76.6 and the product of Example C had an amine number due to secondary amines of 90.3. The higher amine number for the product of this example indicates a larger weight percent of secondary amine groups due to formation of the copolymer.

The foregoing examples have been included as illustrations of the preparation of polysecondary amines and are not to be construed as limitations on the scope of the present invention.

The quaternization of the polysecondary amines to polyquaternary ammonium compounds is carried out by treatment of the polysecondary amine with an excess of organic halide and aqueous sodium hydroxide or other base. If it is desired to prepare polyquaternary ammonium compounds having mixed substituents, the polysecondary amine is first alkylated with one organic halide to form a polytertiary amine and then quaternized with a second organic halide to form the polyquaternary. The alkylation also requires the presence of a base, but only approximately one equivalent of the first organic halide is employed.

Bases which are suitable for either the alkylation or quaternization include sodium hydroxide, potassium hydroxide, barium hydroxide and sodium bicarbonate.

If less than two equivalents of organic halide are employed for every amine group in the polysecondary amine there is obtained a polymer having a mixture of quaternary ammonium groups and tertiary amine groups. In some applications such a product is desirable. The product would have randomly mixed recurring groups of the structures:

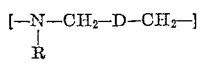

and

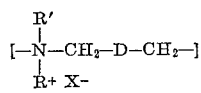

where D, R, R', and X are as previously defined.

Examples of organic halides which can be employed include methyl chloride, ethyl chloride, butyl chloride, hexyl chloride, decyl chloride, stearyl chloride, 1-hexenyl chloride, cyclohexyl chloride, oleyl chloride, linoleyl chloride, 1-decenyl chloride, benzyl chloride chlorobenzene, 3-chloro-1,2-dinitro-benzene, 1 - chloro - 4-fluorobenzene, methyl iodide, ethyl bromide, decyl bromide, chloronaphthalene, 1,4-dichlorobutene-2, dichlorobenzene, 1-chlorodecalin and, β,β-dichloroethyl ether. Acetylenically unsaturated organic halides can be employed if desired, although they are generally not preferred because of high cost and comparative unavailability. The dihalides tend to produce cross-linked products.

The preferred organic halides are the alkyl and alkenyl chlorides and bromides of 1 to 20 carbon atoms; these produce substituents R and R' of alkyl or alkenyl radicals of 1 to 20 carbon atoms.

If the end groups of the polysecondary amine are amino groups, they generally will be quaternized along with the amino groups within the polymer chain.

In order to illustrate certain preferred embodiments of the present invention, the following examples are included. Unless otherwise indicated, all parts and percentages used herein are by weight.

EXAMPLE I

Into a 1 liter stirred autoclave were charged 63 grams of a polysecondary amine having molecular weight of approximately 1400, prepared according to procedure of Example G, 237 grams of isoproponal, and 30 grams of sodium bicarbonate. After heating the reactor to 100° C., methyl chloride was added to the reactor to provide a pressure of 100 p.s.i. As the reaction progressed and carbon dioxide was formed therefrom, the reactor pressure increased considerably. Occasionally, the reactor was vented to 100 p.s.i. or slightly below in order to remove some of the carbon dioxide formed. Methyl chloride under a pressure of 100 p.s.i. was continually fed into the reaction chamber. After two hours, the reactor was cooled, vented and the contents filtered and concentrated by evaporation to give a clear polyquaternary ammonium chloride having a free amine content of 1.6% an amine hydrochloride content of 0, an ionic chloride content of 2.8 and a percent solids of 39.8.

EXAMPLE II

Using substantially the procedure of Example I there were charged to the 1-liter pressure reactor 100 grams of a polysecondary amine prepared according to the method of Example A, 300 grams of isoproponal, and 47.5 grams of sodium bicarbonate. After heating at 100° C. for 2¾ hours, there was recovered a solution of a polyquaternary ammonium chloride having a free amine content of 0.5, amine hydrochloride of 0%, an ionic chloride content of 2.37%, and 30.0% solids.

EXAMPLE III

Using the procedure of Example I there were charged to a 1-liter pressure reactor, 100 grams of a polysecondary amine prepared according to the method of Example C, 300 grams of isoproponal, 47.5 grams of sodium bicarbonate, and 2 grams of sodium hydroxide. After reacting at 100° C. in a 100 p.s.i. for 6¾ hours there was recovered a solution of a quaternary ammonium chloride having a free amine content of 1.6%, an amine hydrochloride content of 0%, an ionic chloride content of 2.13%, and 29.2% solids.

The products of the present invention are effective corrosion inhibitors. They are also useful as flocculents, fabric softeners, biostats, liquid ion exchange agents, antistatic agents, fuel oil stabilizers, and carbohydrate modifying agents.

The embodiments of the present invention in which an exclusive property or privilege is claimed are defined as follows:

1. A copolymer containing the recurring units:

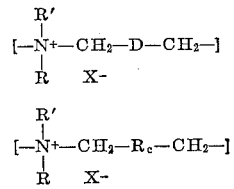

wherein D is a hydrocarbon dimeric fat radical, $R_c$ is selected from the group consisting of divalent m-xylylene radical and a divalent radical of a dinitrile of an acid selected from the group consisting of adipic, pimelic, suberic, azelaic and sebacic acids, R' and R are selected from the group consisting of alkyl and alkenyl radicals having from 1 to 20 carbon atoms, benzyl, phenyl and naphthyl radicals and X is a quaternary ammonium anion.

2. The polymer of the structure:

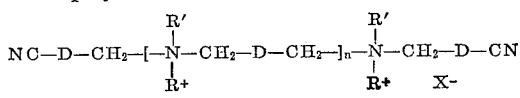

wherein D is the hydrocarbon dimeric fat radical, $n$ is the number of recurring units in the polymeric chain, R and R' are selected from the group consisting of alkyl and alkenyl radicals having from 1 to 20 carbon atoms, benzyl, phenyl and naphthyl radicals and X is a quaternary ammonium anion.

3. The polymer of the structure:

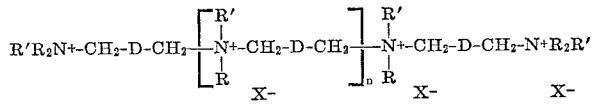

wherein D is a hydrocarbon dimeric fat radical, $n$ is the number of recurring structural units in the polymer chain, R and R' are selected from the group consisting of alkyl and alkenyl radicals having from 1 to 20 carbon atoms, benzyl, phenyl and naphthyl radicals and X is a quaternary ammonium anion.

4. A polymer having the recurring structural unit:

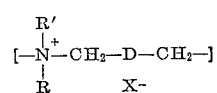

wherein D is a hydrocarbon fat radical, R and R' are selected from the group consisting of alkyl and alkenyl radicals having from 1 to 20 carbon atoms, benzyl, phenyl and naphthyl radicals and X is a quaternary ammonium anion.

5. The polymer of the structure:

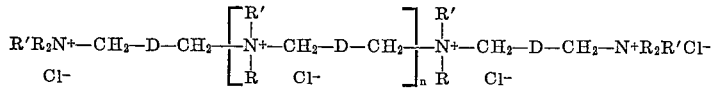

wherein D is the hydrocarbon dimeric fat radical of a dimerized linoleic acid, R and R' are alkyl groups of 1 to 20 carbon atoms, and $n$ is an integer in the range of 2 to 40.

6. The polymer of claim 5 wherein R and R' are methyl.

7. The polymer of the structure:

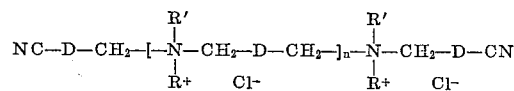

wherein D is the hydrocarbon dimeric fat radical of a dimerized linoleic acid, R and R' are alkyl groups of 1 to 20 carbon atoms, and $n$ is an integer in the range of 2 to 40.

8. The polymer of claim 5 wherein R and R' are methyl.

References Cited by the Examiner
UNITED STATES PATENTS

| | | | |
|---|---|---|---|
| 2,824,861 | 2/1958 | Conbere et al. | 260—89.7 X |
| 2,862,894 | 12/1958 | Hwa | 260—89.7 X |
| 3,028,402 | 4/1962 | Albrecht | 260—567.6 X |
| 3,043,822 | 7/1962 | Maeder | 260—89.7 |
| 3,073,864 | 1/1963 | Harrison et al. | 260—567.6 |

CHARLES B. PARKER, *Primary Examiner.*